United States Patent [19]
Perera et al.

[11] Patent Number: 5,974,121
[45] Date of Patent: *Oct. 26, 1999

[54] ALPHANUMERIC MESSAGE COMPOSING METHOD USING TELEPHONE KEYPAD

[75] Inventors: Surendra Perera, Boynton Beach; Lu Chang, Boca Raton; Jian-Cheng Huang, Lake Worth; Robert J. Schwendeman, Pompano Beach, all of Fla.

[73] Assignee: Motorola, Inc., Schaumburg, Ill.

[*] Notice: This patent is subject to a terminal disclaimer.

[21] Appl. No.: 09/108,828

[22] Filed: Jul. 1, 1998

Related U.S. Application Data

[63] Continuation-in-part of application No. 09/078,733, May 14, 1998.

[51] Int. Cl.[6] .................................................. H04M 11/00
[52] U.S. Cl. ...................................... 379/93.18; 379/93.26
[58] Field of Search ............................ 379/93.01, 93.17, 379/93.18, 93.22–93.28, 93.37; 455/31.2, 31.3, 38.1, 38.5; 340/311.1, 825.44

[56] References Cited

U.S. PATENT DOCUMENTS

| | | |
|---|---|---|
| 4,918,721 | 4/1990 | Hashimoto . |
| 5,031,206 | 7/1991 | Riskin .................................. 379/93.27 |
| 5,515,475 | 5/1996 | Gupta et al. . |
| 5,561,710 | 10/1996 | Helms . |
| 5,659,659 | 8/1997 | Kolesnik et al. . |

*Primary Examiner*—Wing F. Chan
*Attorney, Agent, or Firm*—James A. Lamb

[57] ABSTRACT

An interactive method for composing an alphanumeric message by a caller using a telephone keypad includes storing (215) a lexical database (135) from which unigram probabilities, forward conditional probabilities, and backward conditional probabilities for a plurality of words can be recovered; storing a received sequence of key codes (405) representing a sequence in which keys on a telephone style keypad are keyed; generating a word trellis including candidate words (415) derived from the sequence and the lexical database; determining a most likely phrase (420) from the candidate words, the unigram probabilities, forward conditional probabilities, and backward conditional probabilities; generating a most likely message (425) from the most likely phrase and presenting the most likely message to the caller; and confirming that the most likely message is the alphanumeric message (430).

8 Claims, 8 Drawing Sheets

ALPHANUMERIC MESSAGE COMPOSING METHOD USING TELEPHONE KEYPAD

This application is a continuation-in-part of copending U.S. application Ser. No. 09/078,733 having filing date of May 14, 1998.

FIELD OF THE INVENTION

This invention relates in general to methods for using a telephone keypad for entering an alphanumeric message, and in particular to a method that uses one keystroke per message character.

BACKGROUND OF THE INVENTION

The use of sophisticated personal communication devices (PCDs) such as pagers, that can display and respond to alphanumeric messages, continues to grow more and more common. Alphanumeric messages that are sent to such PCDs are generated by a machine or a person. Examples of machine generated messages are a news update and a stock market update. Messages generated by persons can be composed and sent using a computer connected to a network, or by calling a message entry service staffed by operators who enter the message, or by using a standard telephone instrument, or by using another PCD. The ability to compose alphanumeric messages by using a standard telephone instrument is highly desirable because telephone instruments are ubiquitous and familiar to most people, but adapting a telephone keypad to compose an alphanumeric message has required ingenuity because the telephone keypad was developed for numeric, not alphanumeric entry. Known techniques exist for using a standard telephone keypad for composition of alphanumeric characters. An example of a known technique involves an identification by the user of which of the three or four alphanumeric characters on one key is to be entered into the message. For example, in one method, a key is keyed one to four times within a short time to indicate which of four characters is to be entered. In another method, a key is held depressed while the characters it represents are presented to the user, one at a time (either visually or audibly), and released when the desired character is presented. While these two techniques allow an alphanumeric message to be composed successfully, they are unnatural and difficult for many callers.

Thus, what is needed is a technique for composing an alphanumeric message from a standard telephone keypad that reliable and natural.

DESCRIPTION OF A PREFERRED EMBODIMENT

Figure 1:
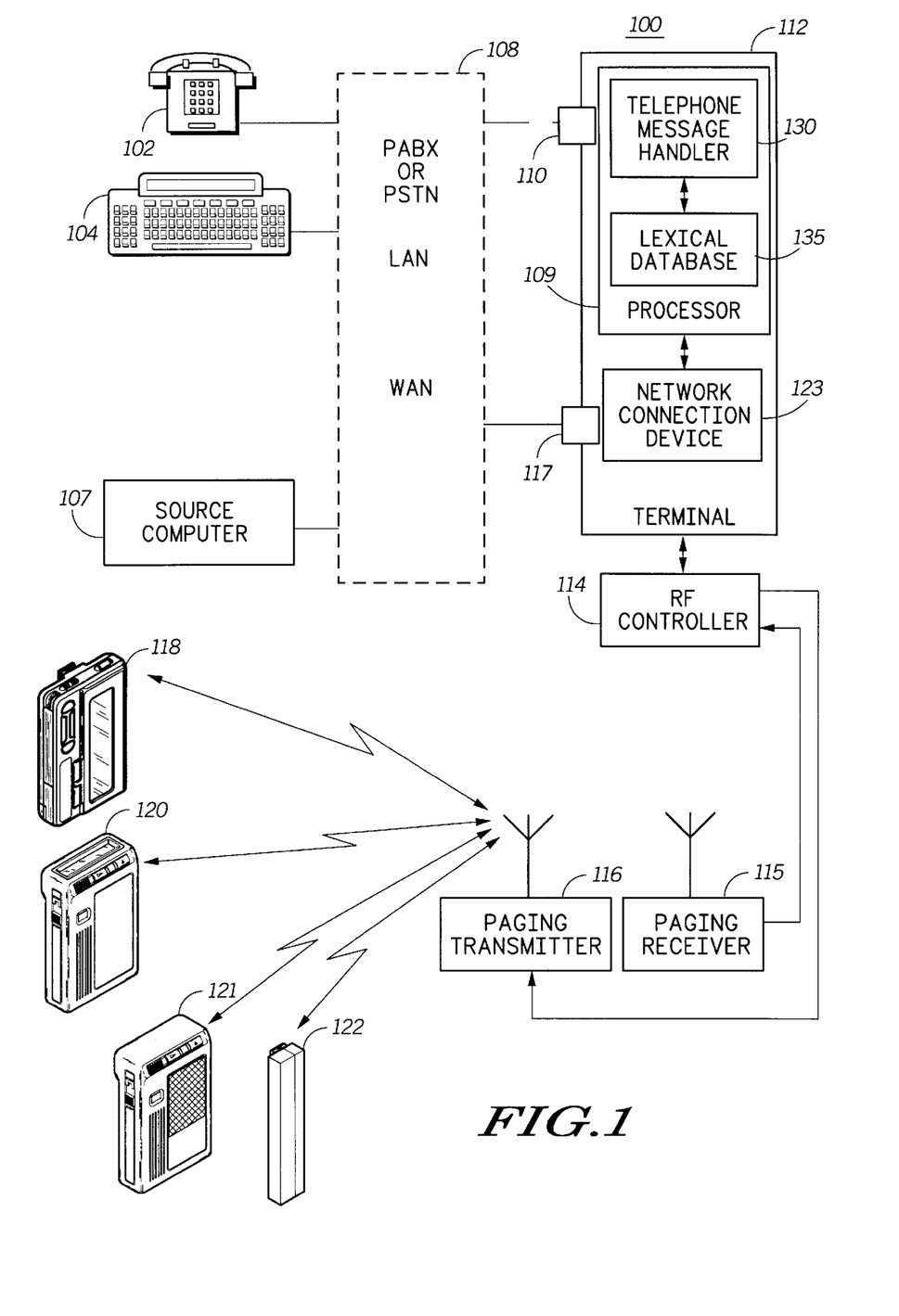
FIG. 1 shows a block diagram of a messaging system, in accordance with a preferred and first, second, and third alternative embodiments of the present invention.

Referring to FIG. 1, a messaging system 100, accepts page or messaging requests from several external sources, e.g. a telephone 102, a page entry device 104, and a source computer 107, in accordance with the preferred embodiment and first, second, and third alternative embodiments of the present invention. The source computer 107 shown here is exemplary in nature, and can function as a messaging client, a world wide web client, an information system host, or as a world wide web host for both retrieving and serving information to other clients.

A page or messaging request is normally accepted through a telephone network input for a public or private telephone network 108 that preferably includes capabilities for connecting to a local area network (LAN) or wide area network (WAN) for effecting high speed network connections to devices such as the source computer 107. The public or private telephone network 108 couples the page request from one of the sources (i.e., voice message or computer message generators) to an automatic telephone input 110 or a network input 117 at a messaging terminal 112. The public or private telephone network 108, as well as dedicated inputs, are connected by one or more network connection devices 123 such as modems or high speed network interfaces, e.g., IEEE 802.3 or the like, supporting TCP/IP or the like connections to both the Internet and intranets.

The messaging terminal 112 comprises the network connection device 123, the automatic telephone input 110, the network input 117, and a processor 109 that comprises a telephone message handler 130 that is coupled to a lexical database 135. The messaging terminal 112 is preferably a conventional WMG™ Administrator! model messaging terminal made by Motorola, Inc., of Schaumburg, Ill. The automatic telephone input 110 provides automatic call connection of received telephone calls in a conventional manner, and couples digitized audio from a telephone call to the processor 109. The telephone message handler 130 comprises a time shared portion of a conventional central processing unit (CPU) and associated processor peripherals, as a result of the CPU being operated under a set of unique telephone message handling program instructions that are stored in conventional mass memory (such as hard disk, and random access memory (RAM). The set of unique program instructions control the operation of the processor 109 to perform the unique functions described herein, below. It will be appreciated that, using conventional task sharing techniques, other conventional sets of program instructions provide other functions of the processor 109 that can run essentially concurrently with the telephone message handler 130.

After accepting the page request, the messaging terminal 112 routes a selective call message comprising a selective call address, and possibly a canned message, to a radio frequency (RF) controller 114 for transmission to a selective call receiver (more generically referred to as a personal messaging device). The message is configured for a protocol, such as the well known FLEX™ protocol licensed by Motorola, Inc., by the RF controller 114, which is preferably a Conductor!™ model RF controller made by Motorola and coupled to a transmitter 116, which is preferably a Symphony™ model transmitter made by Motorola, Inc. Conventional messaging systems may convey information from a caller to pager user via a plurality of message formats. Each message format can denote a mode of data (e.g., characters, numbers, audio, graphics, or "just a beep") being sent to the pager. FIG. 1 illustrates a number of personal messaging devices, alternatively called selective call receivers, subscriber units, and personal messaging units, that can receive information messages from the messaging terminal 112. The personal messaging devices illustrated are an alphanumeric messaging device 118 that is a selective call receiver that is of conventional design and has two way messaging capability, a numeric display pager 120, a voice message pager, 121 and a tone only pager 122. In the later case, the tone only pager 122 (i.e., no message is presented to the user), alerts (e.g., an audible beep), the user that a caller wants the pager user to respond by calling a prearranged telephone number, such as a receptionist telephone number. Additionally, the RF controller 114 is coupled with a conventional messaging receiver 115 that operates to receive inbound signaling information (e.g., acknowledge back responses and return channel messages) from the alphanumeric messaging device 118 and route it to the messaging terminal 112. The alphanumeric messaging device is preferably a Pagewriter™ two way pager made by Motorola, Inc. of Schaumburg, Ill, which has an alphanumeric display. The messaging receiver 115 is preferably an Audience™ model receiver made by Motorola, Inc. The messaging terminal 112, the RF controller 114, the transmitter 116, and the messaging receiver 115 can alternatively be of different model and manufacture.

Figure 2:
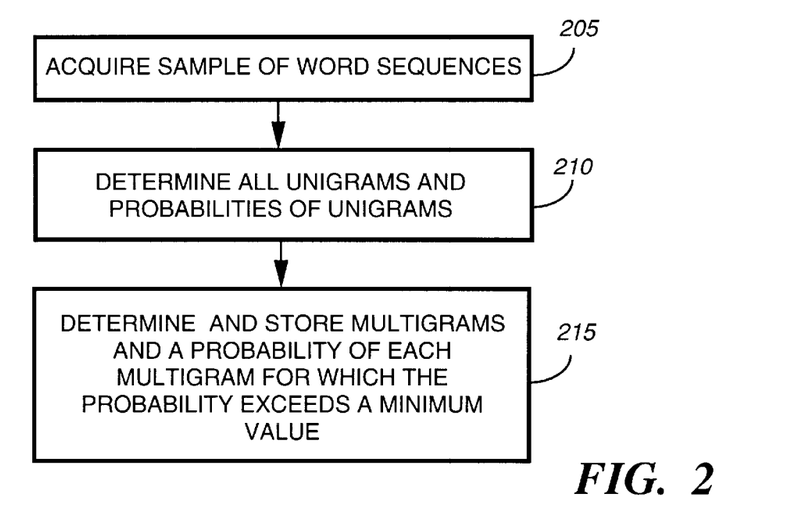
FIG. 2 shows a flow chart of a method used in a messaging terminal of the messaging system for generating a lexical database, in accordance with the preferred and alternative embodiments of the present invention.

Referring to FIG. 2, a method for generating a lexical database is shown, in accordance with the preferred and alternative embodiments of the present invention. The lexical database 135 provides for recovery of candidate words and recovery of probabilities related to the candidate words. The lexical database 135 is generated during a setup operation of the messaging terminal 112, and is stored in a portion of a conventional mass memory. The lexical database 135 is generated by acquiring, at step 205, a large sample of word sequences of the type expected to be used in new messages; determining and storing all unigrams (single words) and probabilities for all the unigrams that are to be included in the lexical database 135 at step 210, based on probabilities of words determined from the large sample; and determining and storing in the lexical database 135 at step 215, multigrams, which, in accordance with the preferred embodiment of the present invention, are bigrams, but which can alternatively be larger word sequences, up to a predetermined maximum length. The multigrams that are stored have probabilities determined from the sample that exceed a predetermined minimum probability. The lexical database 135 is organized in a conventional manner such that a set (or subset) of candidate words is efficiently recovered by the telephone message handler 130 when a sequence (or subsequence) of keypad codes is provided by the telephone message handler 130 to the lexical database 135. The set (or subset) of candidate words includes all the unigrams in the database that are represented by the sequence (or subsequence) of key codes. The lexical database 135 is also organized by storing the multigram word sequences and associated probabilities in a conventional manner such that a forward conditional probability for a lookup word is efficiently recovered by the telephone message handler 130 when the telephone message handler 130 provides the lookup word and preceding words (up to a predetermined maximum word sequence length) to the lexical database 135 in a request for a forward conditional probability lookup. The probability value recovered is the probability for the multigram starting with the lookup word and including as many consecutive preceding words for which a multigram match is found. The lexical database 135 is also organized such that a backward conditional probability for a word is efficiently recovered by the telephone message handler 130 when the telephone message handler 130 provides the lookup word and succeeding words (up to the predetermined maximum word sequence length) to the lexical database 135 and requests a backward conditional probability lookup. The probability value recovered is the probability for the multigram starting with the lookup word and including as many consecutive succeeding words for which a multigram match is found.

When a match is found for a key code sequence (or subsequence), a non-empty set (or subset) of candidate words is recovered. When no match is found for a key code sequence provided to the lexical database 135, a null set (or subset) of candidate words is recovered and a keypad error is assumed by the telephone message handler 130.

When no conditional probability is stored for a given lookup word and preceding words in a forward lookup, or for a given lookup word and succeeding words in a backward lookup, an unconditional unigram probability for the candidate word is recovered by the telephone message handler 130 from the lexical database 135.

In a first alternative embodiment of the present invention, the lexical database 135 stores only the unigram probabilities and one of the forward or backward conditional probabilities are stored. In a second alternative embodiment of the present invention, only the unigram probabilities are stored. In a third alternative embodiment of the present invention, the lexical database 135 stores no probabilities. Thus, in the third alternative embodiment of the present invention, when a key code sequence is presented to the lexical database 135, a set of candidate words is returned, but no probability is provided for the candidate words.

Figure 3:
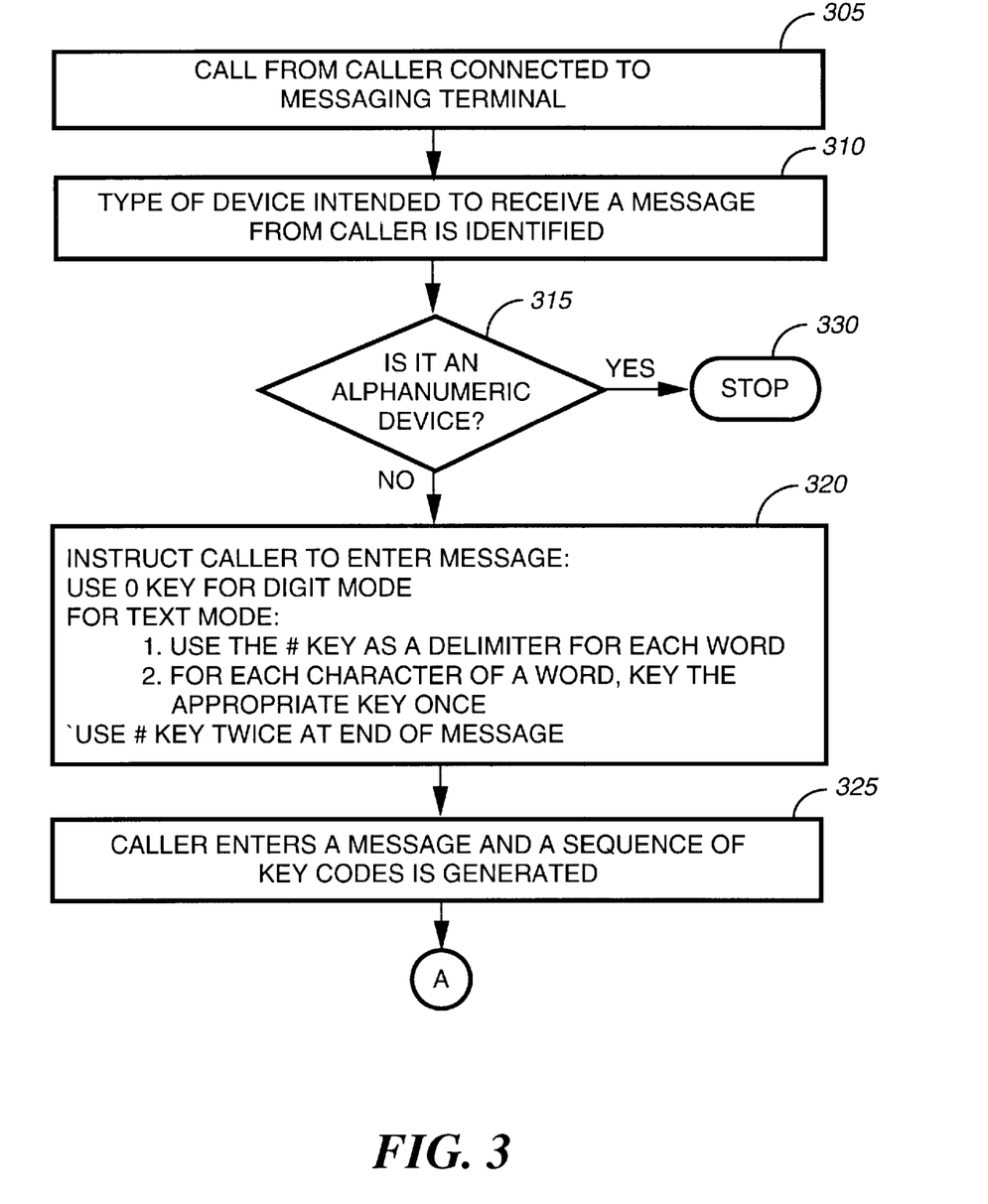
FIGS. 3 and 4 show a flow chart of a method used in the messaging terminal to compose an alphanumeric message using a telephone, in accordance with the preferred and alternative embodiments of the present invention.
Figure 4:
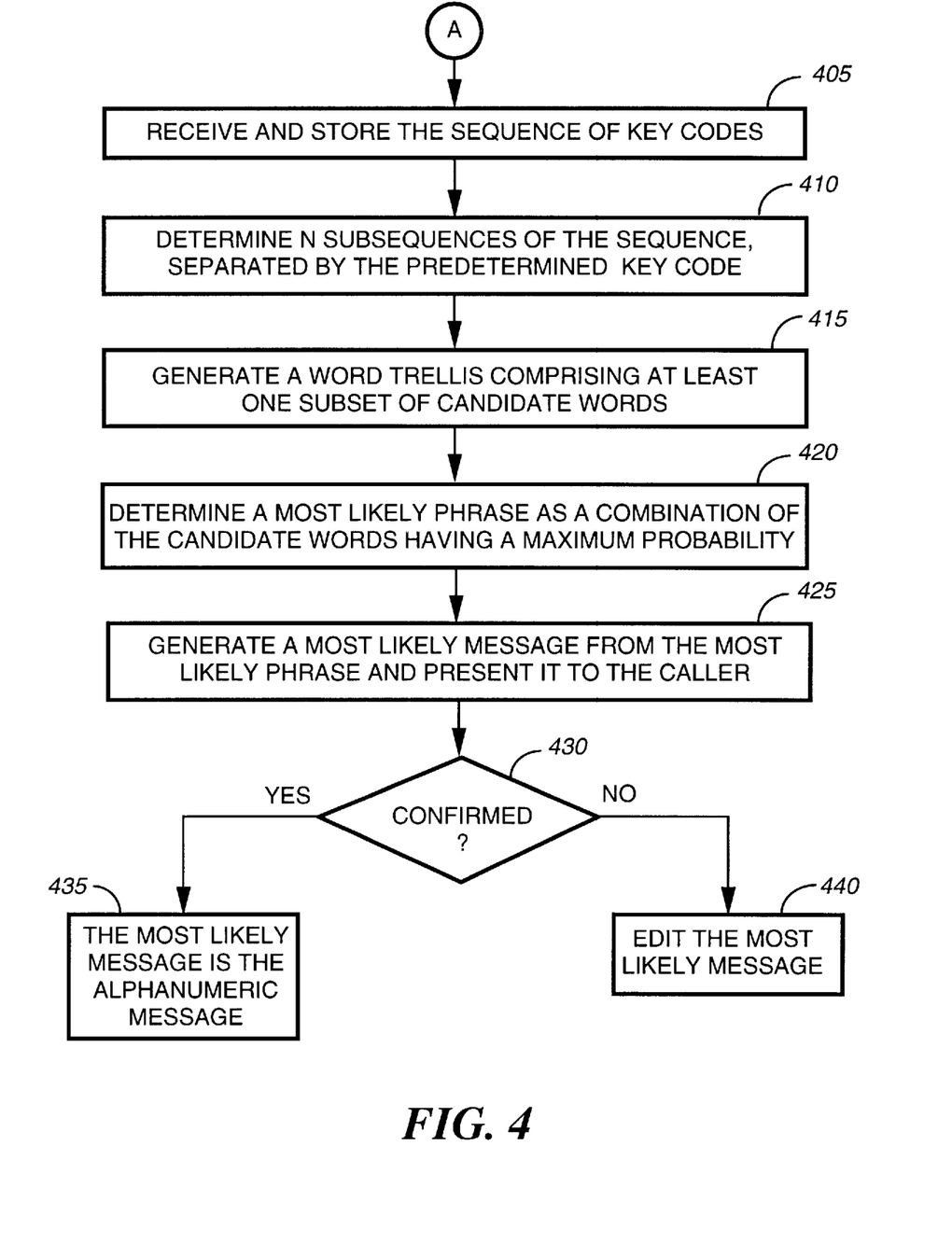

Referring to FIGS. 3 and 4, a flow chart of a method used in the messaging terminal 112 to compose an alphanumeric message using a telephone is shown, in accordance with the preferred and first, second, and third alternative embodiments of the present invention. At step 305, a telephone call is received, and the telephone message handler 130 interacts with the caller in a conventional manner to determine to which specific personal messaging device the caller intends to direct a message. The telephone message handler 130 determines at step 310 which type of personal messaging device it is. When the personal messaging device is determined not to be an alphanumeric messaging device, at step 315, the telephone message handler 130 stops processing this method, at step 330. When the personal messaging device is determined to be an alphanumeric messaging device, at step 315, the telephone message handler 130 instructs the caller at step 320 to perform message entry using the telephone keypad in one of two modes: a digit mode and a text mode. The message entry starts in the text mode unless a predetermined key (preferably, the "0" key) is pressed first. For each alphabetic character, the caller spells out the message, using for each character of the message a key on the telephone keypad that includes the character of the message, pressing the key but once for each character of the message. The caller is also instructed to use a predetermined key, preferably the key labeled with a "#", hereinafter called the # key, as a space between each word (i.e., the # key is a delimiter for alphabetic words). To enter the text mode after the digit mode, the caller also presses the # key. To enter the digit mode, the caller keys the key labeled with a "0". Then, for each digit, the caller presses the desired digit. The end of a digit sequence (or digital "word"), is indicated by the # key code. The caller is instructed to end the message by pressing the # key twice. The predetermined keys ("0", "#") thus generate predetermined key codes that indicate word boundaries, and every word entered in the text mode starts and ends with the # key code, unless it is the first word. It will be appreciated that, in an alternative embodiment, a sequence of two, or possibly more, keys could be used in place of the single predetermined keys ("0", "#") just described. For example, in a system in which more functions are needed, a combination of the # key and another key could be used. It can more generically be said that a predetermined set of key codes is to indicate word boundaries, wherein the predetermined set has length of at least one key code.

A sequence of conventional dual tone multi-frequency DTMF key codes are generated at step 325 when the caller enters the message, that are coupled to the telephone message handler 130 by the automatic telephone input 110 and are received and stored by the telephone message handler 130 at step 405. The sequence of key codes identifies the sequence in which the keys on the telephone keypad are actually keyed, and represents the caller's desired sequence of characters (i.e., the alphanumeric message). It will be appreciated that, due to entry errors, there are occasionally extra key codes or missing key codes in any given sequence of key codes. As an example, the sentence "Can you go to IBM tomorrow morning at 10." is entered as follows (the number on the key is used to identify the key for numbered keys:

keys:
226#968#46#86#426#86667769#6676464#28#010##
CAN YOU GO TO IBM TOMORROW AT 10.

At step 410, the telephone message handler 130 determines N subsequences of the received sequence of key codes. (N is therefore an integer.) The N subsequences are subsequences of key codes separated within the received sequence of key codes by the predetermined key code for the # key. In the example given above, the N subsequences would be the key codes for keys 226, 968, 46, 86, 426, 86667769, 6676464, and 28. At step 415, the telephone message handler 130 generates a word trellis that comprises at least one subset of candidate words, which in this example would be eight subsets of candidate words (i.e., N=8).

Figure 5:
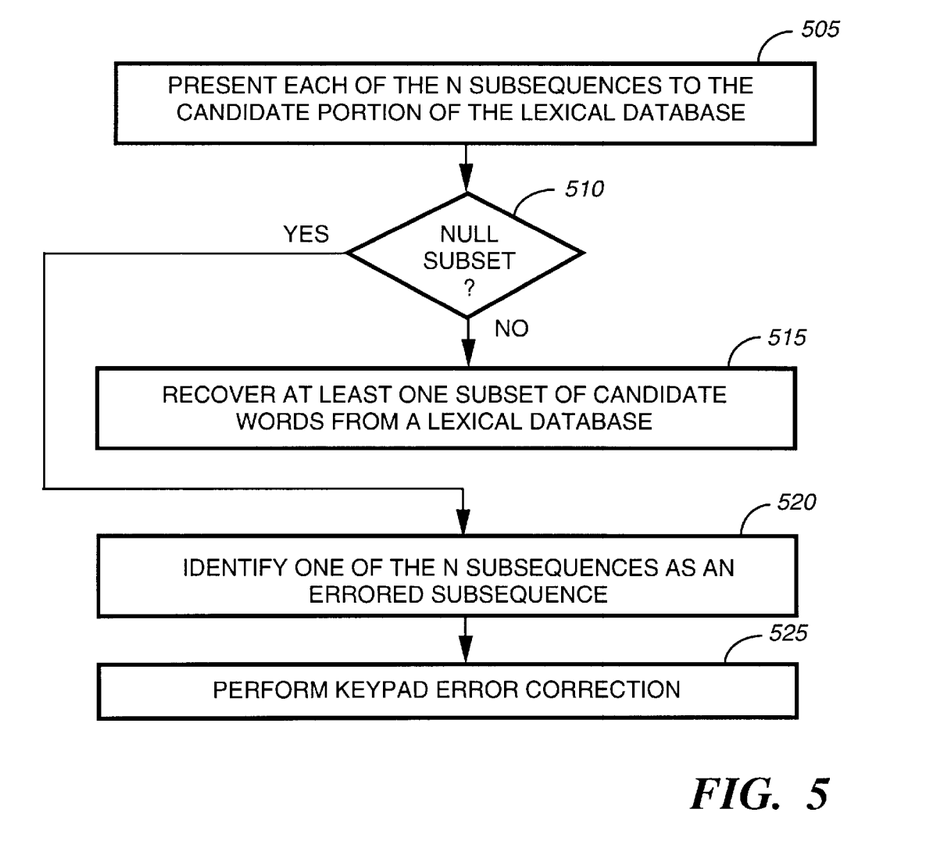
FIG. 5 shows a flow chart of a method used in the messaging terminal for generating a word trellis, in accordance with the preferred and alternative embodiments of the present invention.

Referring to FIG. 5, a flow chart of a method used by the telephone message handler 130 in the messaging terminal 112 for generating the word trellis of step 415 is shown, in accordance with the preferred and first, second, and third alternative embodiments of the present invention. The telephone message handler 130 generates the word trellis by presenting each of the N subsequences, one at a time at step 505, as an input to the lexical database 135. For each of the N subsequences the telephone message handler 130 determines whether a null subset is recovered at step 510. When a null subset is not recovered, the telephone message handler 130 recovers a subset of candidate words at step 515 from the lexical database 135. Recovery of a null subset indicates no candidate words match a presented key code subsequence, and the sequence is identified as an errored sequence at step 520. The telephone message handler 130 performs a keypad error correction at step 525 using the errored sequence.

Figure 6:
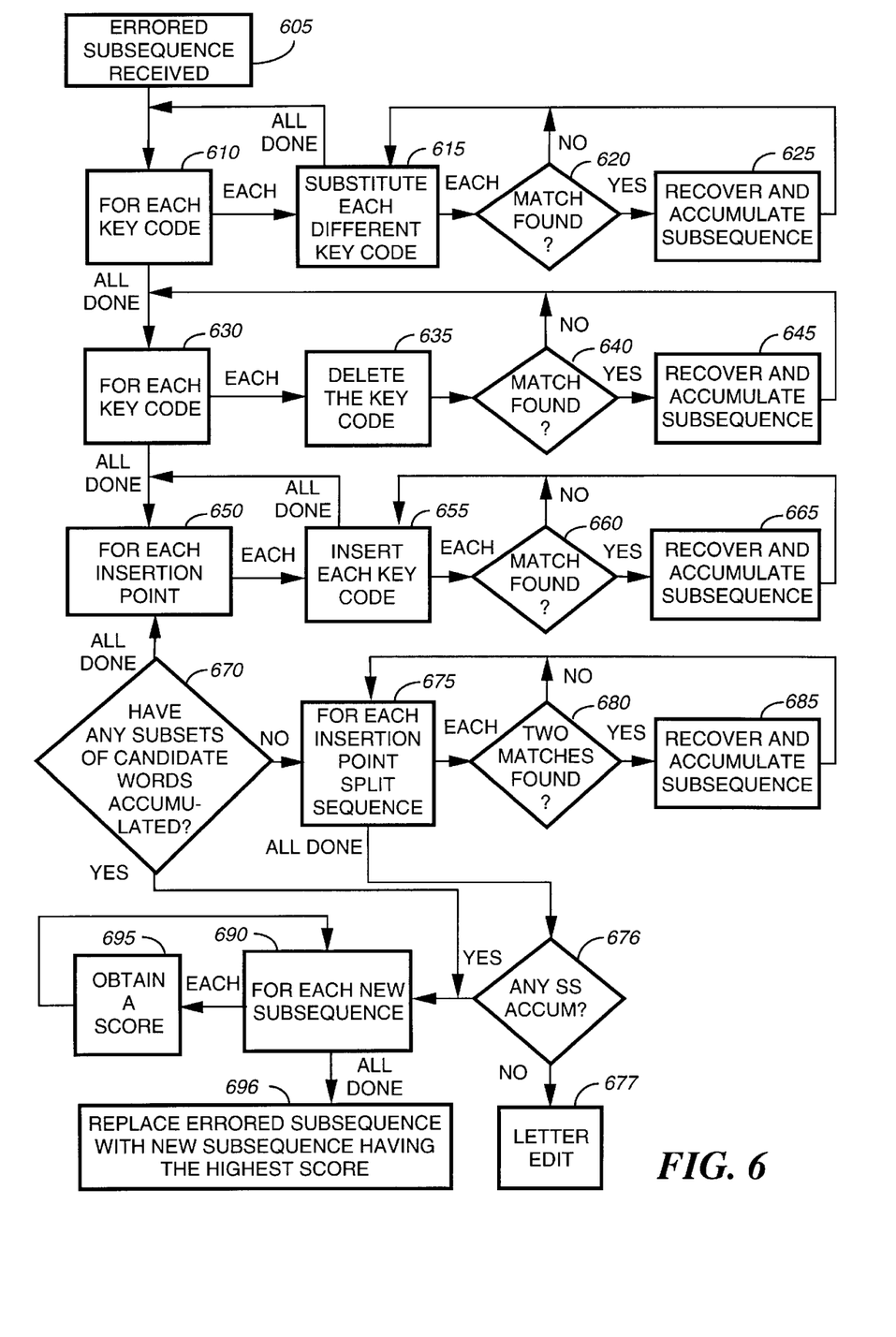
FIG. 6 shows a flow chart of a method used in the messaging terminal for performing keypad error correction, in accordance with the preferred and alternative embodiments of the present invention.

Referring to FIG. 6, a flow chart of a method used by the telephone message handler 130 in the messaging terminal 112 for performing the keypad error correction at step 525 is shown, in accordance with the preferred and first, second, and third alternative embodiments of the present invention. At step 605, the errored sequence by a keypad error correction routine. At step 610, a loop procedure is set up for which each key code of the errored sequence is selected and used once. At step 615 a sub-loop procedure is set up in which a new subsequence is generated by substituting each different key code for the selected key code. At step 620, a test is done to determine whether any candidate words are recovered by the new subsequence. When any candidate words are recovered by the new subsequence, the new subsequence is accumulated in a new subsequence memory at step 625. When no candidate words are recovered by the new subsequence, a next iteration of the sub-loop is started at step 610. When all different key codes have been substituted and tested for all key codes in the errored subsequence, then a new loop procedure is set up at step 630 for which each key code of the errored sequence is selected and used once. At step 635, a new subsequence is generated by deleting the key code selected in step 630. At step 640, a test is done to determine whether any candidate words are recovered by the new subsequence. When any candidate words are recovered by the new subsequence, the new subsequence is accumulated in the new subsequence memory at step 645. When no candidate words are recovered by the new subsequence, a next iteration of the loop is started at step 630. When each key code in the errored subsequence has been separately deleted, then a new loop procedure is set up at step 650 in which each insertion point between two consecutive key codes of the errored sequence is selected and used once. At step 655 a sub-loop procedure is set up in which a new subsequence is generated by inserting each key code at the selected insertion point. At step 660, a test is done to determine whether any candidate words are recovered by the new subsequence. When any candidate words are recovered by the new subsequence, the new subsequence is accumulated in the new subsequence memory at step 665. When no candidate words are recovered by the new subsequence, a next iteration of the sub-loop is started at step 655. When all key codes have been inserted and tested for all insertion points in the errored subsequence, then a test is performed at step 670 to determine whether any subsequences have been accumulated in the new subsequence memory.

When a determination is made that no new subsequences are in the new subsequence memory, a new loop procedure is set up at step 675 for which each insertion point of the errored sequence is selected and used once to generate two new subsequences by splitting the errored subsequence into two subsequences at each selected insertion point. At step 680, a test is done to determine whether at least one candidate word is recovered by the each of the two new subsequences. When candidate words are recovered by the new subsequences, the new subsequences are accumulated in the new subsequence memory at step 685. When candidate words are not recovered by both of the new subsequences at step 685, a next iteration of the loop is performed starting at step 675. When all iterations of step 675 are completed, a test is performed at step 676 to determine whether any subsequences were accumulated at step 685. When no subsequences are determined to have been accumulated, a letter edit procedure (described more fully below) is performed at step 677. When any subsequences are determined to have been accumulated in the new subsequence memory at step 676 or step 670, then a new loop procedure is started at step 690 in which each new subsequence (or set of two new subsequences, in the case that step 685 is performed) that has accumulated in the new subsequence memory is used once. For each new subsequence (or set of two new subsequences), a highest unigram probability of the unigram probabilities of all candidate words that match the new subsequence (or set of two new subsequences) is determined at step 695. This is the new subsequence score. This is repeated for each new subsequence (or set of two new subsequences). At step 696, the new subsequence (or set of two new subsequences) having the highest subsequence score is selected and substituted for the errored subsequence. It will be appreciated that, following keypad error correction at step 525, the number of subsequences will in some cases be increased due to the sequence splitting at step 675, The number of subsequences is therefore identified as Q after step 525, wherein $Q \geq N$.

Referring again to FIG. 4, when the word trellis has been generated at step 415, then in accordance with the preferred, first and second alternative embodiments of the present invention, a determination is made at step 420 of a most likely phrase having a maximum combined probability. In accordance with the third alternative embodiment of the present invention, when the word trellis has been generated at step 415, the method continues as described with reference to FIG. 9, below. In accordance with the preferred and first alternative embodiments, the maximum combined probability is determined as described below with reference to FIG. 7 from those probabilities of the unigram probabilities, forward conditional probabilities, and backward conditional probabilities that are stored in the lexical database 135. The most likely phrase consists of a combination of one candidate word from each subset of candidate words. In accordance with the second alternative embodiment of the present invention, the most likely phrase is determined at step 420 to consist simply of a combination of a most probable candidate word from each subset of candidate words, wherein the most probable candidate word is the one within a subset of candidate words having a maximum unigram probability; steps 705–730 of FIG. 7 are not relevant to this aspect of the present invention.

Figure 7:
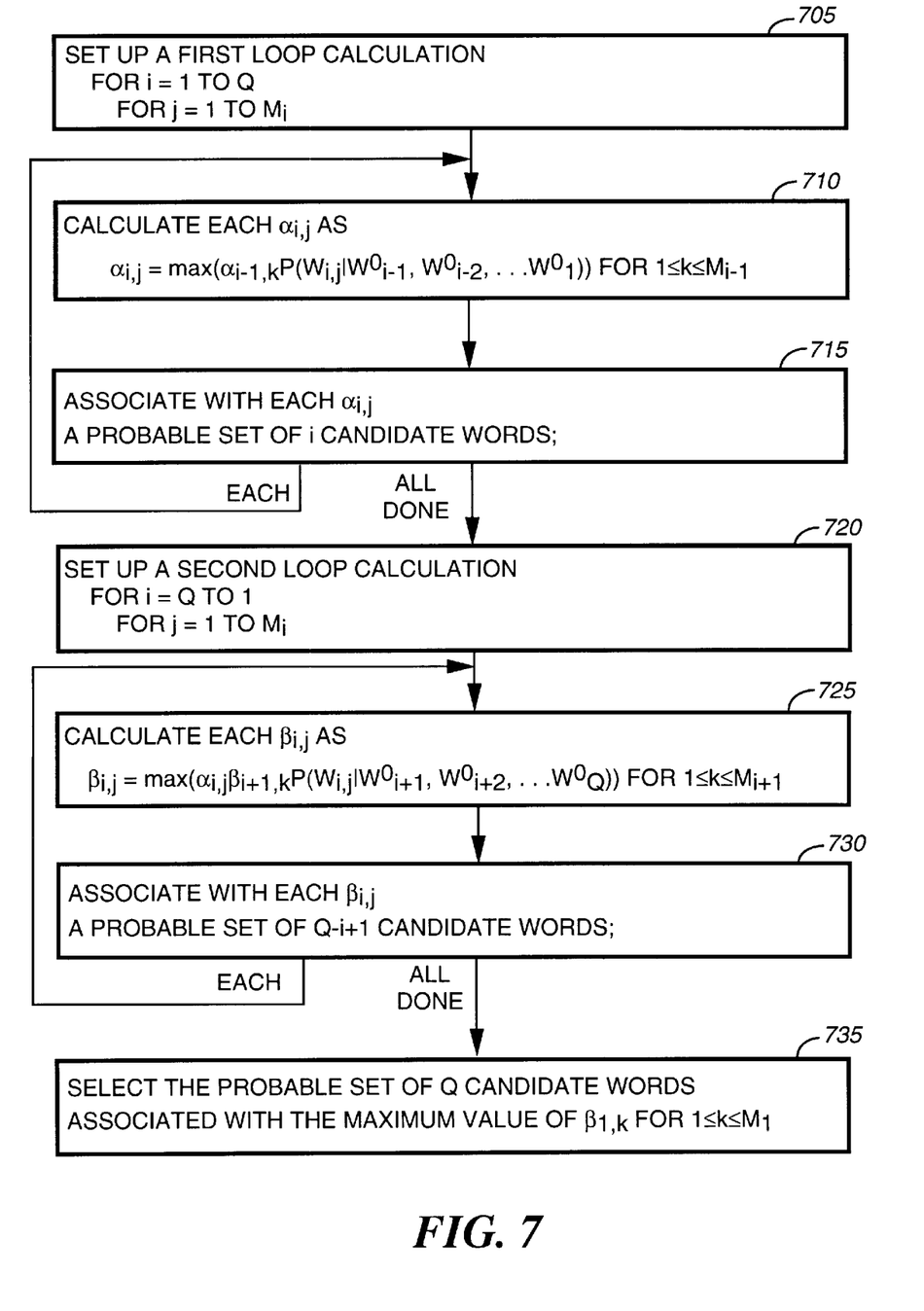
FIG. 7 shows a flow chart of a method used in the messaging terminal for performing a determination of the most likely phrase, in accordance with the preferred and first alternative embodiments of the present invention.

Referring to FIG. 7, a flow chart of a method used by the telephone message handler 130 in the messaging terminal 112 for performing the determination of the most likely phrase at step 420 is shown, in accordance with the preferred and first alternative embodiments of the present invention. At step 705, a double iteration loop is set up in which partial forward probabilities, $\alpha_{i,j}$, are calculated recursively for $i=1, 2, \ldots Q$ in a first iteration, and for $j=1, 2, \ldots M_i$ in a second iteration which is a subiteration to the first iteration. $M_i$ is an integer that is the number of candidate words in an ith subset of candidate words. For each value of i and j, a partial forward probability, $\alpha_{i,j}$, is calculated, as $\alpha_{i,j} = \max(\alpha_{i-1,k} P(w_{i,j}|W^o_{i-1}, W^o_{i-2}, \ldots W^o_1))$ for $1 \leq k \leq M_{i-1}$. In this formula, the expression $w_{i,j}|W^o_{i-1}, W^o_{i-2}, \ldots W^o_1$ indicates the forward conditional probability of the candidate word, $w_{i,j}$, for which the partial probability, $\alpha_{i,j}$, is being calculated, given a set of probable words $W^o_{i-1} W^o_{i-2}, \ldots W^o_1$ that are associated with the $\alpha_{i-1,k}$ that is being used to calculate the $\alpha_{i,j}$. The forward conditional probability of the candidate word, $w_{i,j}$ is obtained by the telephone message handler 130 making a request to the lexical database 135, providing the candidate word, $w_{i,j}$ and the set of probable words that are associated with the $\alpha_{i-1,k}$, as the lookup word and preceding words, as described herein above with reference to FIG. 2.

When the partial forward probability, $\alpha_{i,j}$, has been determined by selecting the maximum value of the $M_{i-1}$ products (of the preceding partial forward products and the associated forward conditional probabilities), a set of probable words is associated with the partial forward probability, $\alpha_{i,j}$, by adding the candidate word to a set of probable words associated with the $\alpha_{i-1,j}$ that produces $\alpha_{i,j}$, and associating the new set of probable words with $\alpha_{i,j}$.

When all of the partial forward probabilities have been calculated at steps 710 and 715, then a new double iteration loop is set up at step 720 in which partial combination probabilities, $\beta_{i,j}$, are calculated recursively for $i=Q, Q-1, \ldots 1$ in a first iteration, and for $j=1, 2, \ldots M_i$ in a second iteration which is a subiteration to the first iteration. For each value of i and j, a partial combination probability, $\beta_{i,j}$, is calculated, as $\beta_{i,j} = \max(\alpha_{i,j} \beta_{i+1,k} P(w_{i,j}|W^o_{i+1}, W^o_{i+2}, \ldots W^o_Q))$ for $1 \leq k \leq M_{i+1}$. In this formula, the expression $w_{i,j}|W^o_{i+1}, W^o_{i+2}, \ldots W^o_Q$ indicates the backward conditional probability of the candidate word, $w_{i,j}$, for which the partial probability, $\beta_{i,j}$, is being calculated, given a set of probable words $W^o_{i+1}, W^o_{i+2}, \ldots W^o_Q$ that are associated with the $\beta_{i+1,k}$ that is being used to calculate the $\beta_{i,j}$. The backward conditional probability of the candidate word, $w_{i,j}$ is obtained by the telephone message handler 130 making a request to the lexical database 135, providing the candidate word, $w_{i,j}$ and the set of probable words that are associated with the , $\beta_{i+1,k}$, as the lookup word and succeeding words, as described herein above with reference to FIG. 2.

When the partial combined probability, $\beta_{i,j}$, has been determined by selecting the maximum value of the $M_{i+1}$ products (of the associated partial forward probability, the preceding partial combined products and the associated backward conditional probabilities), a new set of probable words is associated with the partial combined probability, $\beta_{i,j}$, by adding the candidate word to the set of probable words associated with the $\beta_{i+1,j}$ that produces $\beta_{i,j}$, and associating the new set of probable words with $\beta_{i,j}$.

When all of the partial combined probabilities have been calculated at steps 725 and 730, then the most likely phrase is selected at step 735 by finding the set of probable words associated with a maximum combined probability, $\max(\beta_{1,j})$ for $1 \leq j \leq M_1$.

It will be appreciated that the above recursive calculations could be done by other methods that are essentially similar and which would yield approximately the same, as will be obvious to those of ordinary skill in the art. For example, partial backward probabilities instead of partial forward probabilities could be calculated in steps 705–715, with obvious changes being made to the formulas shown herein at steps 705–730.

In accordance with the first alternative embodiment of the present invention, one of the forward or backward conditional probabilities are not included in the lexical database 135. In this aspect of the present invention, either the steps 705–715 or the steps 720–730 are deleted as determined by the conditional probability that is not used.

Referring again to FIG. 4, a most likely message is generated and presented to the caller at step 425 in accordance with the preferred, first, and second alternative embodiments of the present invention. The most likely message is preferably generated by recombining the most likely phrase with the digits that were entered by the caller in the digit mode, during step 405. The most likely message is presented to the caller using conventional computer synthesis of the words and digits. When the most likely message has been presented to the caller, a confirming of the alphanumeric message from the most likely message is then performed at step 430. A confirmation occurs when the caller responds to the presentation with an affirmative indication at step 430, and results in a completion of the composition of the alphanumeric message at step 435, using the most likely message, which is then sent to the desired alphanumeric messaging device. A non-confirmation occurs at step 430 when the caller responds to the presentation with a disaffirmative indication at step 430, and results in an editing of the most likely message, at step 440.

Figure 8:
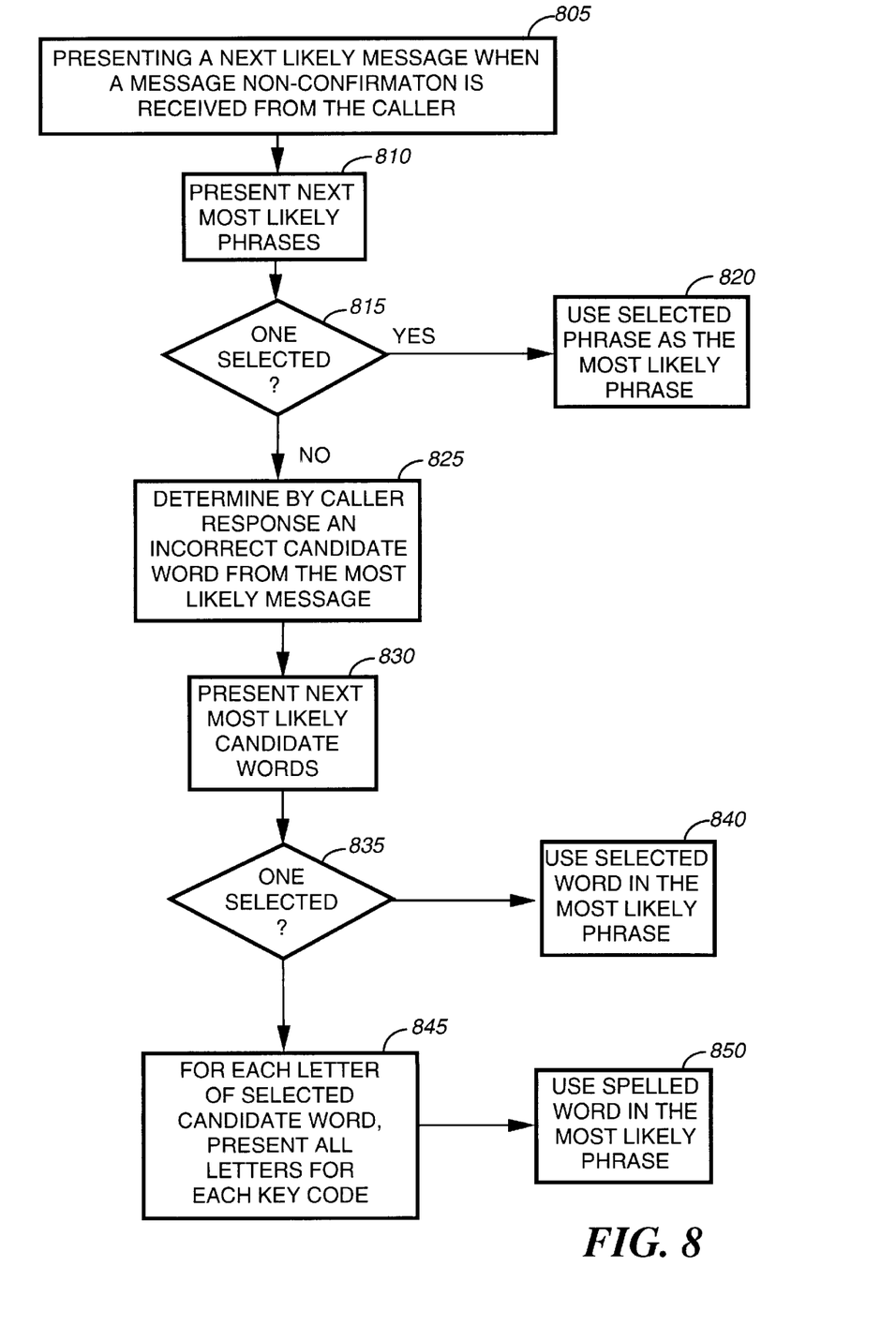
FIG. 8 shows a flow chart of a method used in the messaging terminal for performing editing, in accordance with the preferred, first, and second alternative embodiments of the present invention.

Referring to FIG. 8, a flow chart of a method used by the telephone message handler 130 in the messaging terminal 112 for performing the editing of step 440 is shown, in accordance with the preferred, first and second alternative embodiments of the present invention. By responses from the caller, an incorrect candidate word is identified by the caller at step 805. At step 810, up to R next most likely messages are presented one at a time to the caller in accordance with the preferred and first alternative embodiments of the present invention. The R next most likely messages are selected as the sets of probable words associated with the partial combined probabilities, $\beta_{1,k}$ for $1 \leq k \leq M_1$, wherein the $\beta_{1,k}$ are the $\beta_{1,k}$ as determined above when steps 725 and 730 have been completed, sorted in descending order of value, to which the digits and letters have been recombined (as in step 425). (In accordance with the first alternative embodiment, when only forward conditional probabilities are used, then substitute $\alpha$ for $\beta$ and steps 710 and 715 for steps 725 and 730 in the previous sentence.) In accordance with the preferred and first alternative embodiments of the present invention, R is one, but can alternatively be larger. When the caller selects one of the next most likely phrases at step 815, it is sent to the desired alphanumeric messaging device at step 820. When the caller identifies none of the next most likely messages as the alphanumeric messages at step 815, then the most likely message is again presented to the caller who can select one of the candidate words for editing at step 825. When the caller selects one of the candidate words, the telephone message handler 130 recovers from the lexical database 135 the other candidate words corresponding to the subsequence from which the selected candidate word was determined, and presents them to the caller in order of their unigram probability at step 830. When the caller selects one of them at 835, the selected word is used in place of the candidate word in the most likely phrase, at step 840. When the caller selects none of the candidate words as the correct word at step 835, then the telephone message handler 130 presents all letters represented by each key code in the subsequence, one letter at a time at step 845, and the caller confirms the correct letter corresponding to each key code, thereby generating an edited word that is used in the most likely phrase at step 850. For example, when the caller has pressed the keys identified by the numbers 3,6,7, the messaging terminal 112 responds with audio message that says "Please press the pound key when the correct letter is stated. "D" "E" "F" "M" "N" "O" "P" "R" "S". When more than one candidate word is wrong, steps 825 to 850 are repeated as necessary to correct all candidate words. The digits and letters are then recombined with the most likely phrase finally generated at one of steps 820, 840 and 850 to generate the most likely message.

Steps 845 and 850 are also used, independently of the above method described that includes steps 805 to 850, as a method of performing step 677 described above with reference to FIG. 6.

In accordance with the second alternative embodiment of the present invention, when the most likely message is non-confirmed at step 430, then no next likely phrases are presented to the caller as described above with reference to steps 805–820, and a determination is made at step 825 (FIG. 8) of an incorrect candidate word. The method then continues as described above with reference to steps 830–850. Additional incorrect candidate words are determined, as necessary, and steps 830–850 are repeated for them.

Figure 9:
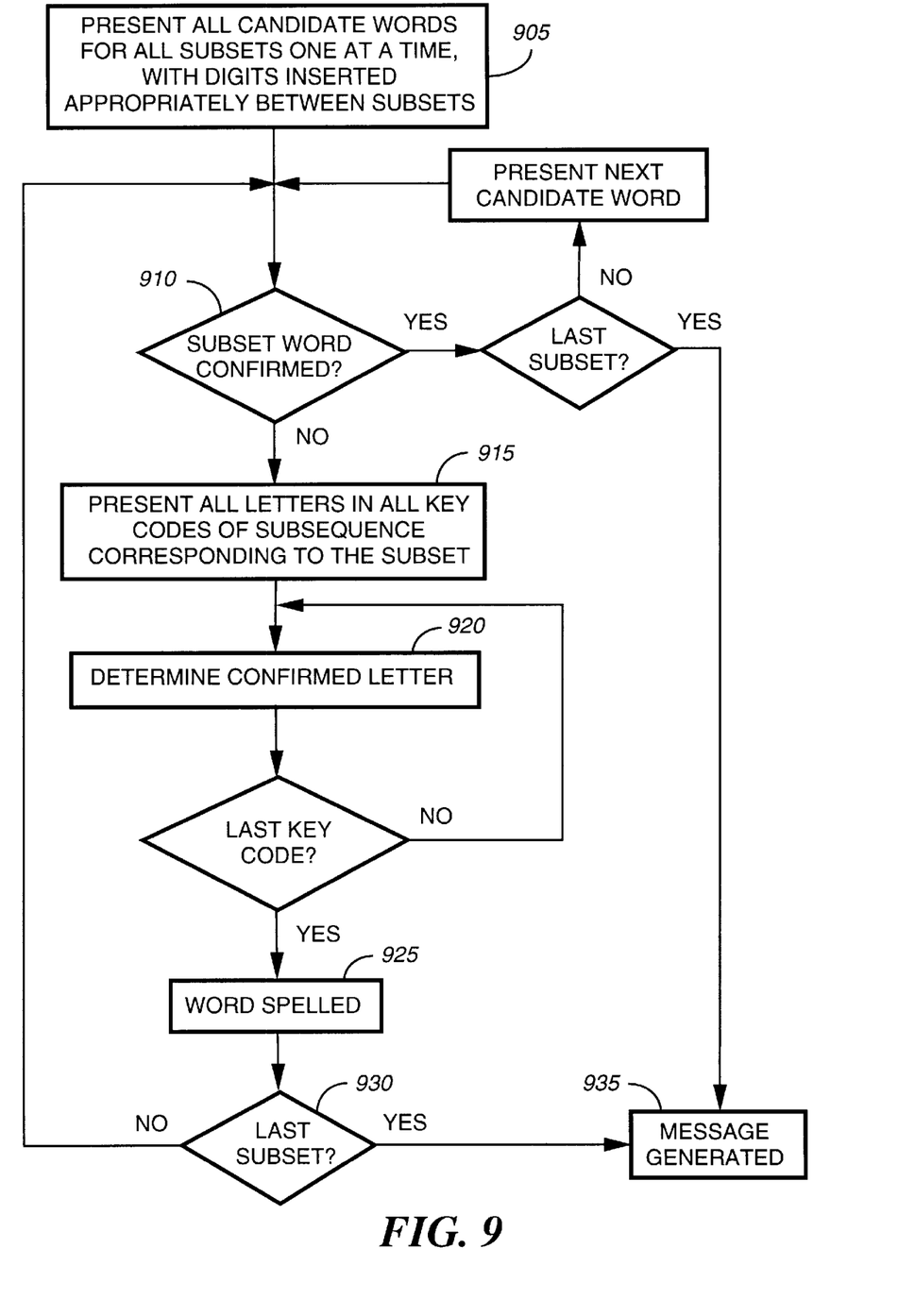
FIG. 9 shows a flow chart of a method of generating the alphanumeric message from the subsets of candidate words, in accordance with the third alternative embodiment of the present invention.

Referring to FIG. 9, a flow chart shows a method of generating the alphanumeric message from the subsets of candidate words, in accordance with the third alternative embodiment of the present invention. When the word trellis has been generated at step 415 (FIG. 4), then in accordance with the third alternative embodiment of the present invention, all candidate words in all subsets of candidate words are presented to the caller at step 905, in which all candidate words are presented one candidate word at time from each subset of candidate words to the caller, in order of receipt of the subsequences. The digits that were entered by the caller in the digit mode, during step 405, are inserted between the subsets of candidate words in their original positions and also presented to the caller. The candidate words and digits are presented to the caller using conventional computer synthesis of the words and digits. At step 910, a candidate word is confirmed for a first subset of candidate words, or the first subset is non-confirmed, by one or more caller responses (verbal or key pad entries) during the step of presenting all candidate words. In response to a non-confirmation at step 910, all letters represented by all key codes in a subsequence of the received sequence of key codes are presented at step 915. The subsequence corresponds to the first subset of candidate words. All letters are presented one letter at time to the caller. A confirmed letter is determined for each key code at step 920 by one or more caller responses during the step of presenting all letters. When all letters for a subsequence are confirmed, a word has been spelled. When all candidate words for all subsets of candidate words have been either confirmed or spelled, the alphanumeric message has been generated.

It will be appreciated that while the interactive method for composing an alphanumeric message using a telephone keypad as described herein, in accordance with the preferred embodiment of the present invention, uses a standard telephone keypad that is found in most telephones in the USA, the invention can be readily used in accordance with alternative embodiments. For example, the keypad could be directly connected to a processor by parallel signals, in a conventional fashion often used in portable telephones. In such an embodiment, a sequence of key codes is generated that corresponds to the sequence in which the keys on the key pad are keyed, but the key codes are parallel binary codes instead of DTMF codes. Also, the key pad need not be a standard USA telephone keypad but could be a keypad having extra keys or characters of other languages. When the key pad includes keys each of which represents more than one alphanumeric character, the benefits of the present invention would be achieved. Such a keypad is identified herein as a telephone style keypad, for simplicity. When another language is used, the lexical database is changed accordingly.

It will be appreciated that the operation of storing the entire key code sequence for the desired alphanumeric message in the manner described herein above with reference to FIGS. 3 and 4 allows a determination of a most likely phrase using both forward and backward conditional probabilities in a unique manner that provides better results than prior art real time decoding devices, such as voice recognition systems, that use only forward conditional probabilities. It will be further appreciated that a unique set of keypad error correction techniques have been described that provide efficient and automatic identification of probable corrections when a caller unintentionally miskeys, omits a key, or adds a key into the message being composed. It will be further appreciated that a unique set of message correction techniques have been described that provide efficient and natural, hierarchical editing of messages to generate the alphanumeric message the caller is composing.

We claim:

1. An interactive method for composing an alphanumeric message by a caller using a telephone keypad, comprising in a messaging terminal the steps of:

storing a lexical database comprising a plurality of words;

storing a received sequence of key codes that identifies a sequence in which keys on a telephone style keypad are pressed in order to enter the alphanumeric message;

generating a word trellis from the sequence of key codes, the word trellis comprising at least one subset of candidate words recovered from the lexical database;

determining a most likely phrase having a maximum combined probability determined from probabilities stored in the lexical database, that comprises a combination of one candidate word from each of the at least one subset of candidate words;

generating a most likely message from the most likely phrase and presenting the most likely message to the caller;

confirming that the most likely message is the alphanumeric message; and editing the most likely message when, in response to the step of confirming, a message non-confirmation is received from the caller, wherein the step of editing the most likely message further comprises the steps of:

determining by caller response an incorrect candidate word from the most likely message, wherein the incorrect candidate word is in a first subset of candidate words;

presenting other candidate words in the first subset of candidate words that includes the incorrect candidate, one word at time to the caller in decreasing order of unigram probability, until all the candidate words have been presented or a word confirmation is received from the caller;

presenting all letters represented by each key code in a subsequence of the received sequence of key codes, wherein the subsequence corresponds to the first subset of candidate words that includes the incorrect candidate word, and wherein all letters are presented one letter at time to the caller; and determining a confirmed letter for each key code by one or more caller responses during the step of presenting all letters.

2. An interactive method for composing an alphanumeric message by a caller using a telephone keypad, comprising in a messaging terminal the steps of:

storing a lexical database comprising a plurality of words;

storing a received sequence of key codes that identifies a sequence in which keys on a telephone style keypad are pressed in order to enter the alphanumeric message;

generating a word trellis from the sequence of key codes, the word trellis comprising at least one subset of candidate words recovered from the lexical database;

generating the alphanumeric message from the subsets of candidate words, comprising the steps of presenting all candidate words in all subsets of candidate words, wherein all candidate words are presented one candidate word at time from each subset of candidate words to the caller, and one of the steps of confirming a candidate word from a first subset of candidate words by one or more caller responses during the step of presenting, and non-confirming a first subset of candidate words by one or more caller responses during the step of presenting.

3. The method according to claim 2, wherein the step of generating the alphanumeric message further comprises the steps of:

presenting all letters represented by all key codes in a subsequence of the received sequence of key codes in response to the step of non-confirming, wherein the subsequence corresponds to the first subset of candidate words, and wherein all letters are presented one letter at time to the caller; and determining a confirmed letter for each key code by one or more caller responses during the step of presenting all letters.

4. An interactive method for generating a word trellis from an alphanumeric message entered by a caller using a telephone keypad, comprising in a messaging terminal the steps of:

storing a lexical database comprising a plurality of words;

storing a received sequence of key codes that identifies a sequence in which keys on a telephone style keypad are pressed in order to enter the alphanumeric message; and generating a word trellis from the sequence of key codes, the word trellis comprising at least one subset of candidate words recovered from the lexical database, the step of generating comprising the steps of determining N subsequences of the received sequence of key codes, wherein the N subsequences are subsequences of key codes separated within the received sequence of key codes by a predetermined set of key codes, recovering the at least one subset of candidate words from the lexical database based on an input to the lexical database of one of the N subsequences, identifying one of the N subsequences as an errored subsequence when a null subset is recovered from the lexical database, and performing keypad error correction using the errored subsequence.

5. The method according to claim 4, wherein the step of performing keypad error correction comprises the steps of:

generating a new subsequence from the errored subsequence by substituting a different key code for one of the key codes within the errored subsequence; and recovering a subset of candidate words from the lexical database based on the new subsequence, after the step of generating.

6. The method according to claim 4, wherein the step of performing keypad error correction comprises the steps of:

generating a new subsequence from the errored subsequence by deleting one of the key codes within the errored subsequence; and recovering a subset of candidate words from the lexical database based on the new subsequence, after the step of generating.

7. The method according to claim 4, wherein the step of performing keypad error correction comprises the steps of:

generating a new subsequence from the errored subsequence by selecting an insertion point adjacent to a key code within the errored subsequence;

inserting a key code at the insertion point; and recovering a subset of candidate words from the lexical database based on the new subsequence, after the step of inserting.

8. The method according to claim 4, wherein the step of performing keypad error correction comprises the steps of:

selecting an insertion point between two consecutive key codes within the errored subsequence;

splitting the errored subsequence into two new subsequences at the insertion point; and recovering two subsets of candidate words from the lexical database based on the two new subsequences.

* * * * *